(12) United States Patent
Nelle

(10) Patent No.: US 6,349,481 B1
(45) Date of Patent: Feb. 26, 2002

(54) DEVICE AND METHOD FOR ATTACHING A SCALE

(75) Inventor: Günther Nelle, Bergen (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/537,625

(22) Filed: Mar. 29, 2000

(30) Foreign Application Priority Data

Mar. 29, 1999 (DE) .......................................... 199 14 311

(51) Int. Cl.$^7$ ........................... G01B 21/16; G01B 21/02
(52) U.S. Cl. ............................... 33/702; 33/701; 33/706
(58) Field of Search .......................... 33/701, 702, 703, 33/706, 707, 708

(56) References Cited

U.S. PATENT DOCUMENTS

| | | |
|---|---|---|
| 4,136,958 A | 1/1979 | Nelle |
| 4,381,609 A | 5/1983 | Holstein |
| 4,413,416 A | 11/1983 | Ernst |
| 4,509,262 A | 4/1985 | Nelle |
| 4,549,353 A * | 10/1985 | Souji ........................... 33/706 |
| 4,570,346 A | 2/1986 | Burkhardt |
| 4,700,482 A | 10/1987 | Kraus |
| 5,063,685 A | 11/1991 | Morrison et al. |
| 5,095,637 A | 3/1992 | Kraus |
| 5,279,043 A * | 1/1994 | Rieder et al. .................. 33/702 |
| 5,551,163 A | 9/1996 | Affa |
| 5,655,311 A | 8/1997 | Affa |
| 5,832,616 A * | 10/1998 | Fieler ........................... 33/706 |
| 6,092,296 A | 7/2000 | Nelle |
| 6,163,970 A * | 12/2000 | Nelle et al. .................... 33/708 |

FOREIGN PATENT DOCUMENTS

| | | |
|---|---|---|
| DE | 197 00 367 | 7/1998 |
| EP | 0 388 453 | 6/1993 |

OTHER PUBLICATIONS

"NC–Langenmesssysteme" published by Heidenhain, Sep., 1998, pp. 58–59.
Pending Patent Application Assigned to Dr. Johannes Heidenhain GmbH or Carl Zeiss Jena GmbH—Patent Application Serial No.: 09/003,764, Inventor: Boege et al., Filing Date: unknown.
Pending Patent Application Assigned to Dr. Johannes Heidenhain GmbH or Carl Zeiss Jena GmbH—Patent Application Serial No.: 09/131,050, Inventor: Tondorf, Filing Date: Aug. 7, 1998.
Pending Patent Application Assigned to Dr. Johannes Heidenhain GmbH or Carl Zeiss Jena GmbH—Patent Application Serial No.: 09/178,214, Inventor: Tondorf et al., Filing Date: Oct. 23, 1998.
Pending Patent Application Assigned to Dr. Johannes Heidenhain GmbH or Carl Zeiss Jena GmbH—Patent Application Serial No.: 09/299,216, Inventor: Kovac, Filing Date: Apr. 22, 1999.
Pending Patent Application Assigned to Dr. Johannes Heidenhain GmbH or Carl Zeiss Jena GmbH—Patent Application Serial No.: 09/548,478, Inventor: Muller et al., Filing Date: Apr. 13, 2000.

* cited by examiner

Primary Examiner—G. Bradley Bennett
(74) Attorney, Agent, or Firm—Brinks Hofer Gilson Lione

(57) ABSTRACT

A device for the attachment of a scale component of a length measuring system to a mounting surface of a first body, wherein a second body is arranged to be displaceable in relation to the first body in a measuring direction, wherein an adhesive layer is provided between the scale component and the mounting surface. The device includes at least one spacer that holds the scale component and supports the scale component at a distance from the mounting surface and is displaceably mounted on the mounting surface for alignment; and wherein the at least one spacer is actuated to remove the support and to make the holding force of the adhesive layer between the scale component and the mounting surface effective.

18 Claims, 4 Drawing Sheets

DEVICE AND METHOD FOR ATTACHING A SCALE

Applicant claims, under 35 U.S.C. §119, the benefit of priority of the filing date of Mar. 29, 1999 of a German patent application, copy attached, Serial Number 199 14 311.0, filed on the aforementioned date, the entire contents of which is incorporated herein by reference.

BACKGROUND OF THE INVENTION

1. Field of the Invention

The invention relates to a process for attaching a scale or scale carrier of a length measuring system, as well as to a device designed for this purpose.

2. Discussion of Related Art

Very long scales are often required on machine tools or coordinate measuring machines for position measuring. These scales must be fastened so that they are oriented parallel in relation to the measuring direction, wherein the measuring direction is fixed by the guide of the machine tool or measuring machine.

Various methods for attaching scales have already been proposed. In accordance with EP 0 388 453 B1, a self-adhering tape scale is glued on by an applicator and is oriented in relation to the guided running of a carriage of a machine tool or a measuring machine. This type of fastening provides a good coordination between the measuring tape and the scanning head, but can only be employed in connection with highly elastic scales in the form of tapes.

A step is described in DE 197 00 367 A1, in accordance with which, for aligning a measuring tape, lateral contact elements are fastened along the length of the measuring tape, against which the measuring tape is placed.

A type of fastening for thin measuring tapes, which is also widely used, has in its longitudinal extension the measuring tape is received in a groove. This is described on pages 58 and 59 of the September 1998 company publication "NC Längenmesssysteme" [NC Length Measuring Systems] of the Dr. Johannes Heidenhain GmbH. In accordance with this, profiled receivers made of extruded aluminum are fastened on a fastening surface by a tape which is adhesive on two sides, and thereafter the measuring tape is pushed into the receiving groove of the profiled section. Here, too, the problem lies in aligning the profiled receiving section exactly parallel in respect to the measuring direction.

With adhesive fastening of a scale or a scale carrier there is the general problem of the adhesive force of the glue being so great that an alignment is no longer possible after the surfaces to be connected have been brought into contact with each other. The methods for alignment known so far are particularly suited for flexible measuring tapes. Scales as well as scale carriers—in particular profiled receivers—which are relatively inherently stable are difficult to fasten in an aligned manner by the known methods.

OBJECT AND SUMMARY OF THE INVENTION

An object of the invention is therefore based on disclosing a process and a device, by which even scales or scale carriers which are relatively inherently stable can be aligned in a simple manner and glued to a body.

The above object is attained by a process for the attachment of a scale component of a length measuring system to a mounting surface of a first body in a directional manner, wherein a second body is arranged to be displaceable in relation to the first body in a measuring direction, wherein the attachment takes place by an adhesive. The process includes supporting the scale component by at least one spacer so that the scale is held spaced apart from the mounting surface, aligning the scale component on the mounting surface in this position by displacing the spacer, removing the at least one spacer at the end of the aligning process; and moving the scale component in the direction of the mounting surface in order to make the holding force of the adhesive between the aligned scale component and the mounting surface effective.

The above object is also attained by a device for the attachment of a scale component of a length measuring system to a mounting surface of a first body, wherein a second body is arranged to be displaceable in relation to the first body in a measuring direction, wherein an adhesive layer is provided between the scale component and the mounting surface. The device includes at least one spacer that holds the scale component and supports the scale component at a distance from the mounting surface and is displaceably mounted on the mounting surface for alignment; and wherein the at least one spacer is actuated to remove the support and to make the holding force of the adhesive layer between the scale component and the mounting surface effective.

Details of the invention will be further explained in what follows by means of the embodiment represented in the drawings.

DETAILED DESCRIPTION OF THE PREFERRED EMBODIMENT

Figure 1:
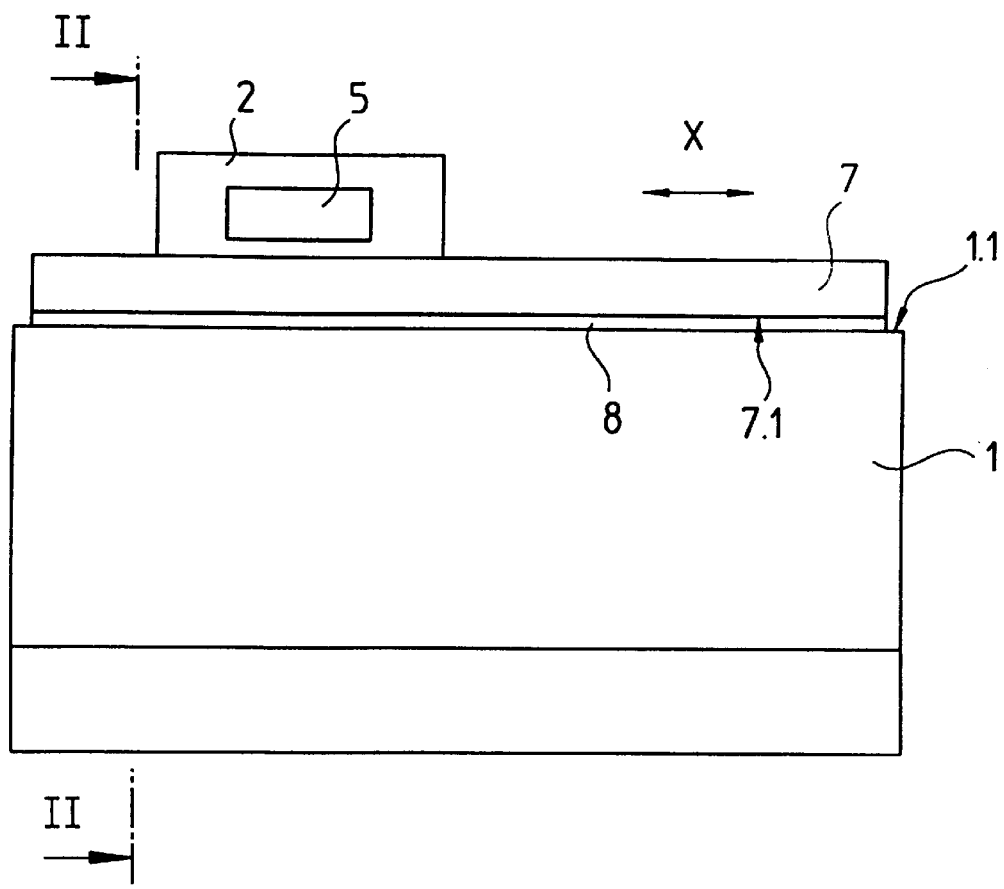
FIG. 1 is a basic representation of a coordinate measuring machine with an aligned scale carrier in a longitudinal plan view.
Figure 2:
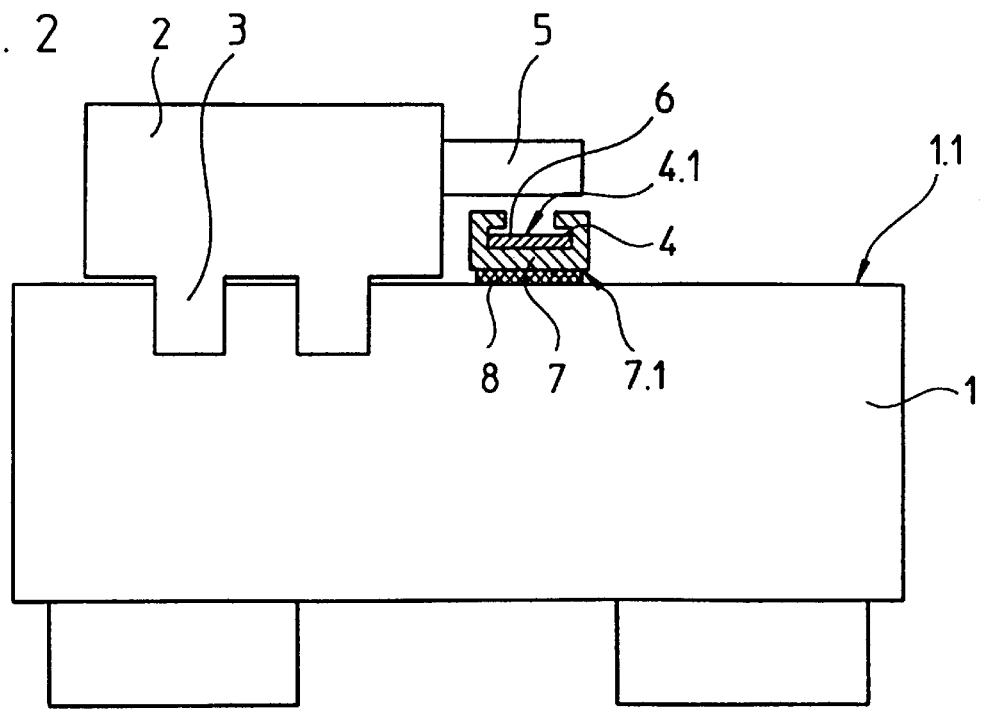
FIG. 2 shows the arrangement in FIG. 1 in a cross section II—II.

A coordinate measuring machine, having a machine bed 1 and a carriage 2, is represented in FIGS. 1 and 2. The carriage 2 can be displaced in the longitudinal direction X along a linear guide 3. A length measuring device, including a scale component, which includes scale 4, and a scanning head 5, is used for detecting the position of the carriage 2 in relation to the bed 1. In the example represented, the scale 4 is a metal tape, which is interlockingly fastened in a groove 6 of a scale carrier 7 that in combination with the scale 4 forms the scale component. The scale carrier 7 is provided on its underside 7.1 with an adhesive foil 8, which is adhesive on two sides. The adhesive foil 8 with the adhesive layers 8.1 and 8.2 is shown on an enlarged scale in FIG. 4.

So that the scanning head 5 can scan the graduation 4.1 of the scale 4 in a continuous and contact-free manner during the movement of the carriage 2 in relation to the bed 1, it is necessary for the scale carrier 7 to be fastened aligned parallel in respect to the displacement direction X of the scanning head 5, and therefore of the carriage 2. This alignment can only take place in a state in which the holding force of the adhesive 8.2 between the scale carrier 7 and the mounting surface 1.1 of the bed 1 is not yet effective, i.e. wherein the adhesive 8.2 is not yet in contact with this surface 1.1. In order to be able to easily align the scale carrier 7 in spite of this, the latter is placed on the mounting surface 1.1 by spacers 9. The function of the spacers 9 is to hold the scale carrier 7 parallel and at a distance from the mounting surface 1.1 in order to be able to easily displace it in a defined manner on the mounting surface 1.1 and therefore to align it.

Figure 3:
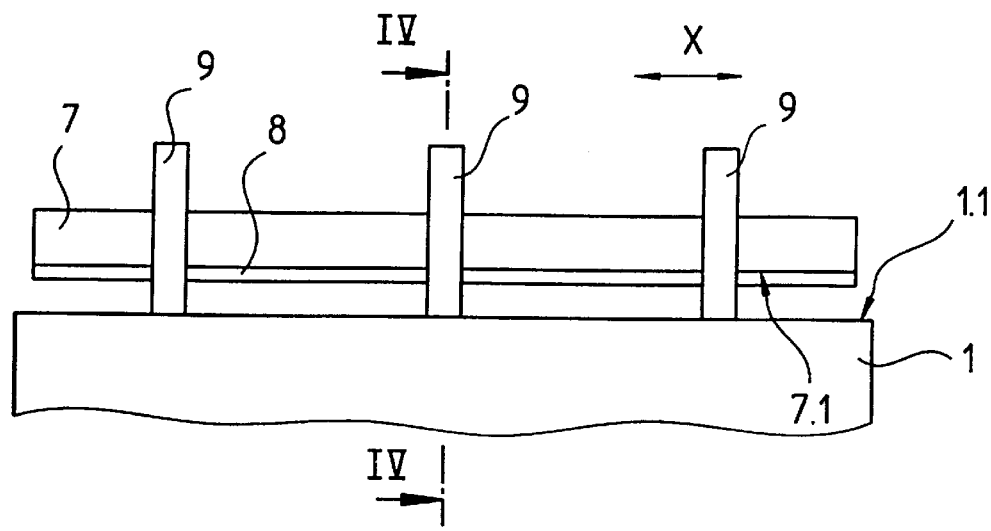
FIG. 3 is a longitudinal plan view of the scale carrier in a mounted state.
Figure 4:
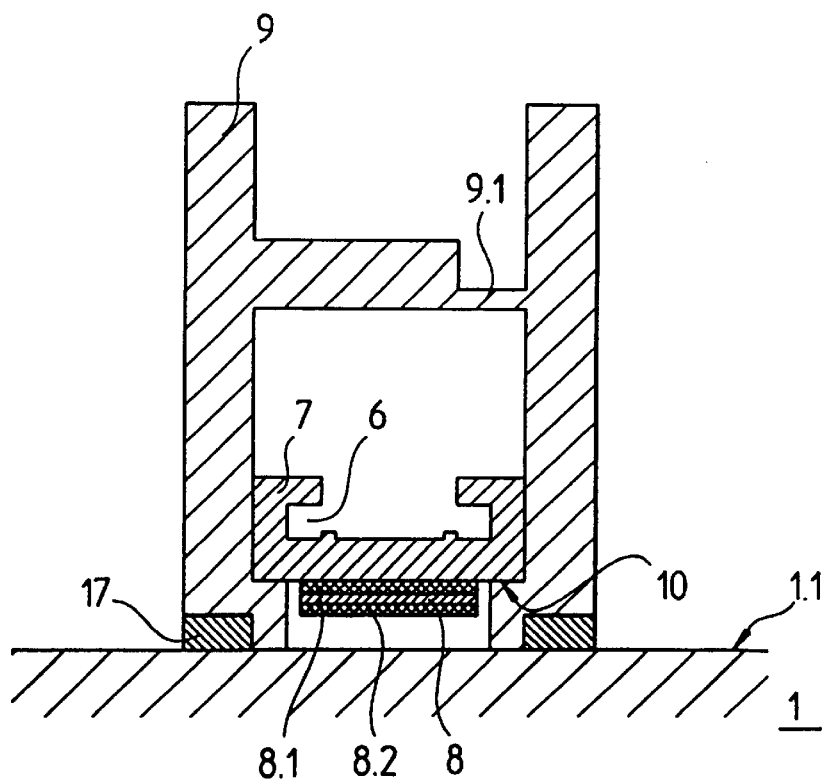
FIG. 4 is a cross section IV—IV in FIG. 3 on an enlarged scale.

A first mounted state of the scale carrier 7 is represented in FIGS. 3 and 4. At several points, which are spaced apart from each other in the measuring direction X, the relatively inherently stable scale carrier 7 is held at a distance from the mounting surface 1.1 by the spacers 9. The adhesive layer 8.2 of the adhesive foil 8 applied to the scale carrier 7 does not touch the mounting surface 1.1 at any point. The spacers 9 are designed in such a way that they laterally extend around the scale carrier 7, so that the scale carrier 7 is held free of play transversely in respect to the measuring direction X and at a short distance from the mounting surface 1.1. The spacers 9 are distributed over the total length of the scale carrier 7 in such a way that bending between two spacers 9 remains so small that the adhesive layer 8.2 does not touch the mounting surface 1.1.

To keep the scale carrier 7 at a distance from the mounting surface 1.1, the spacer 9 can support the scale carrier 7 only clampingly or, as represented in FIG. 4, a rest 10 can alternatively or additionally be provided on the spacer 9, on which the scale carrier 7 rests with an area of its underside 7.1 which is free of adhesive. The spacer 9 represented in FIG. 4 is embodied to be H-shaped. The inner surfaces of the two legs form a fit for holding the lateral faces of the scale carrier 7 free of play. With particularly long scale carriers 7, it is advantageous if at least one of the legs of the spacer 9 is designed to be resiliently pivotable transversely in relation to the measuring direction X. In accordance with FIG. 4, the right leg is pivotable by a joint 9.1, so that this leg of the spacer 9 can be spread open for easily receiving the scale carrier 7.

Figure 5:
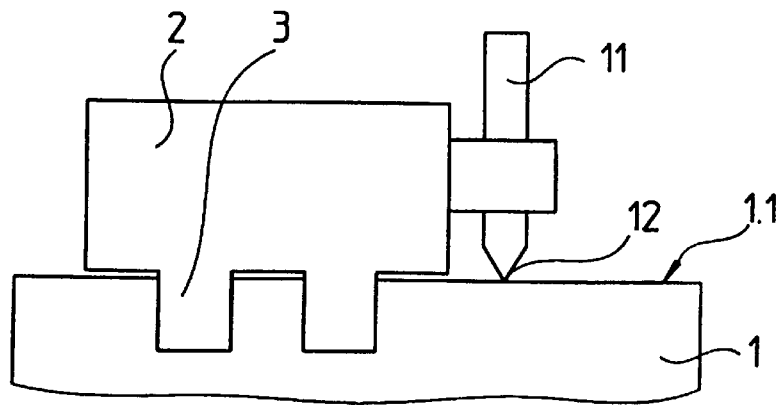
FIG. 5 represents a first option for aligning the scale carrier.

The following steps can be helpful for simply aligning the scale carrier 7 with the spacers 9 parallel in relation to the displacement direction X of the scanning head 5:

In accordance with FIG. 5, a marking pin 11 or a marking tool is attached to the machine carriage 2—preferably in place of the scanning head 5—or on the scanning head 5 itself in such a way that the tip defines the correct edge position of the scale carrier 7 or of the spacers 9. A line 12, which is parallel in relation to the measuring direction X, is marked on the mounting surface 1.1 by moving the machine carriage 2 along the guide 3. The scale carrier 7, or the spacers 9 with the scale carrier 7 held on them, are aligned on this line 12 and glued to it after the spacers 9 have been removed. The removal of the spacers 9 is advantageously performed by displacing them toward the end of the scale carrier 7. In the course of this, the scale carrier 7 behind the displaced, and therefore removed spacers, is forced on the mounting surface 1.1 by its weight, by mechanical pressure or by magnetic force, so that the holding force of the adhesive 8.2 takes effect.

Figure 6:
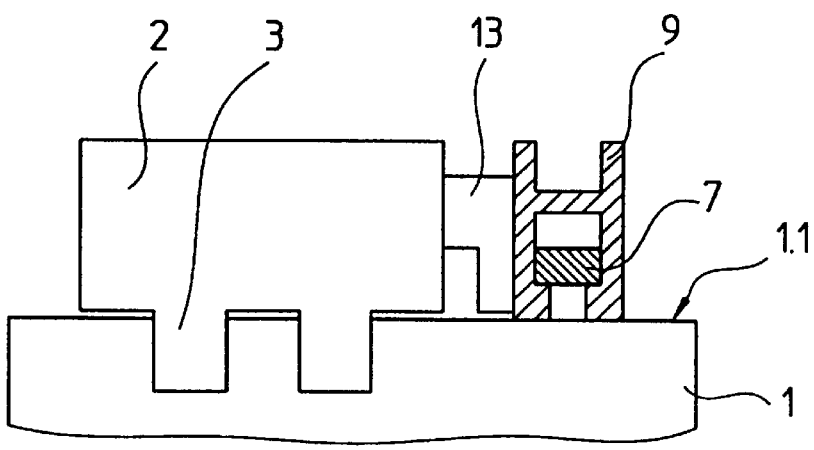
FIG. 6 represents a second option for aligning the scale carrier.

In accordance with FIG. 6, a positioning piece 13 is fastened on the machine carriage 2—preferably in place of the scanning head 5—or on the scanning head 5 itself, which fixes the correct position of the lateral face of the scale carrier 7 perpendicularly in relation to the measuring direction X. The carriage 2, together with the positioning piece 13, is moved along the scale carrier 7 in the measuring direction X, and the scale carrier 7 or the spacers 9 are positioned against the positioning piece 13. In this case, the scale carrier 7 can be first partially aligned at one point, and the spacer 9 can be removed at this point, and the adhesive layer 8.2 of the scale carrier 7 can also be already partially pressed against the mounting surface 1.1. In this state, the scale carrier 7 can still be pivoted around this already glued point, so that at a point distanced therefrom in the measuring direction X, the alignment and gluing can simply take place in the same way after the positioning piece 13 has been displaced.

Figure 7:
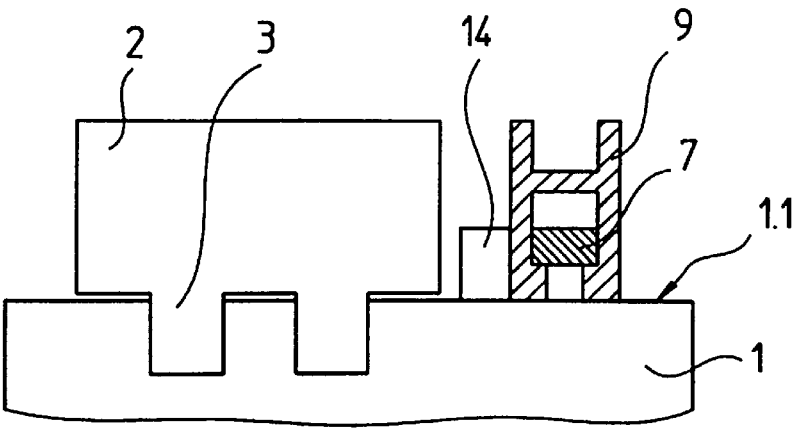
FIG. 7 represents a third option for aligning the scale carrier.

In accordance with FIG. 7, first a strip 14 is fastened on the mounting surface 1.1 as a positioning element. The scale carrier 7 or the spacers 9 are positioned against this strip 14. The scale carrier 7 is aligned by displacement of the spacers 9 in respect to the scale carrier 7 in the measuring direction X along the strip 14, and in the aligned state the scale carrier 7 will come into contact with the mounting surface 1.1 in the no longer supported areas because of gravity, contact pressure or magnetic force, and is glued to it. The strip can also be replaced by spaced apart positioning elements. The strip 14, or respectively the positioning elements, can also be applied in accordance with the method described in DE 197 00 367 A1, in which case the positioning elements then are preferably taped or glued to the mounting surface 1.1.

Figure 8:
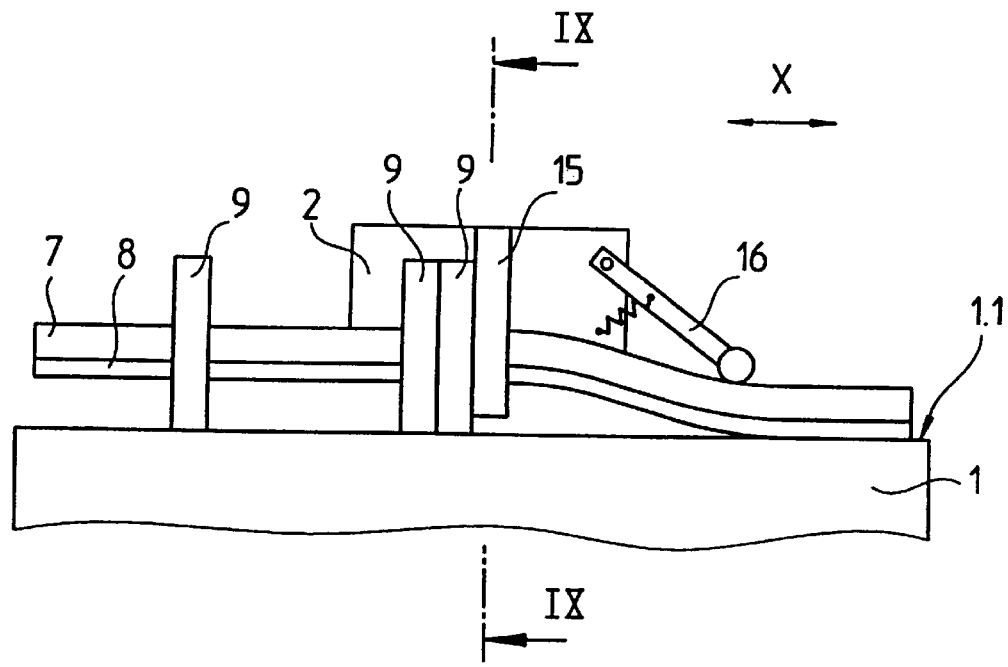
FIG. 8 is a longitudinal plan view of the scale carrier in a mounted state.
Figure 9:
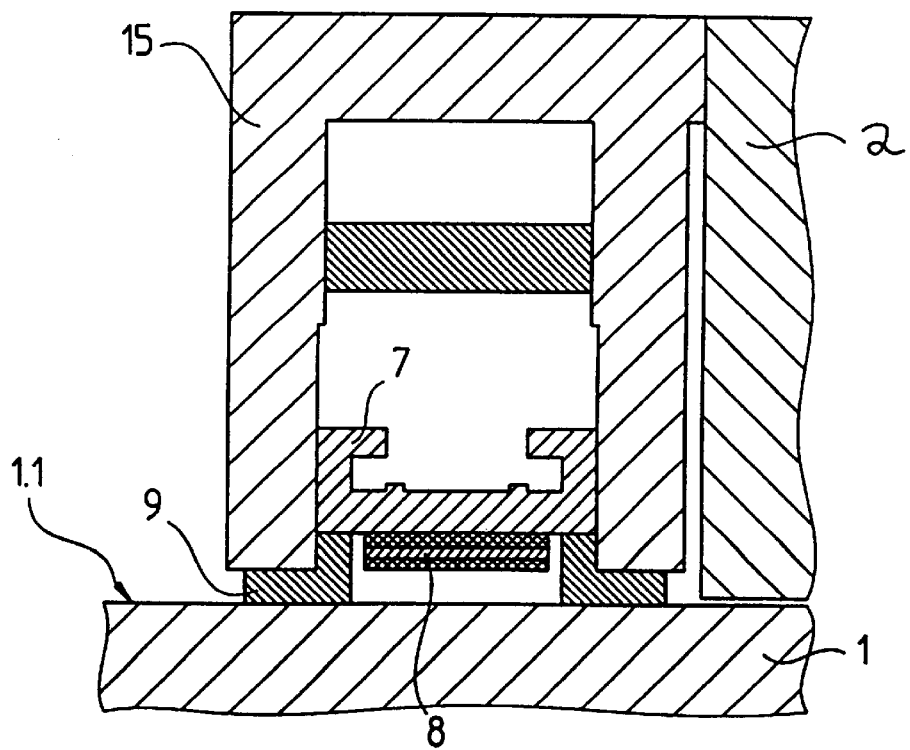
FIG. 9 shows the scale carrier in FIG. 8, enlarged and in cross section IX—IX.

In accordance with FIGS. 8 and 9, an adjustment element 15 is fastened on the machine carriage 2—preferably in place of the scanning head—or on the scanning head 5 itself, which extends around the scale carrier 7 at the lateral edges with no play. The scale carrier 7 is placed on the mounting surface 1.1 by the spacers 9, the fork-shaped adjustment element 15 is brought into engagement with the scale carrier 7 at one place and, by displacing the carriage 2 in relation to the scale carrier 7, the spacers 9 are continuously displaced in the measuring direction X by means of the adjustment element 15, and the scale carrier 7 drops behind the adjustment element 15 on the mounting surface 1.1 in an aligned manner, or is pressed on the mounting surface 1.1. A pressure element 16 can be fastened on the carriage 2 for this purpose which, for example, urges the adhesive surface 8.2 of the scale carrier 7 resiliently against the mounting surface 1.1. The scale carrier 7 is guided without lateral play and aligned in the spacers 9, as well as the adjustment element 15.

The spacers 9 can contain magnets 17 for displaceably adhering to magnetic mounting surfaces 1.1 (FIG. 4), or they can contain connecting elements for vacuum hoses in order to adhere displaceably to the mounting surface 1.1 by a vacuum. Because of these options, the scale carrier 7 can also be aligned on vertical mounting surfaces or in a suspended manner.

The scale carrier 7 moreover can also be held on the spacers 9 magnetically or by a vacuum, wherein the magnetic force, or respectively the vacuum, are purposely reduced in the aligned state in order to cancel the connection between the spacer 9 and the scale carrier 7 and to bring the scale carrier 7 into contact with the mounting surface 1.1 and to glue it in this way.

The scale 4 can already be fastened to the scale carrier 7 during the alignment, or can be inserted into the groove 6 of the scale carrier 7 after gluing.

The described steps can also find use for aligning and mounting a scale 4 itself. In this case the scale 4 can be a steel tape, a steel strip or a glass plate.

The adhesive foil 8 can be provided on the mounting surface 1.1 alternatively or additionally. Also, a different adhesive layer can be provided continuously or in sections in place of the adhesive foil 8.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. A process for the attachment of a scale component of a length measuring system to a mounting surface of a first body in a directional manner, wherein a second body is arranged to be displaceable in relation to the first body in a measuring direction (X), wherein the attachment takes place by an adhesive, the process comprising:

supporting the scale component by at least one spacer so that the scale is held spaced apart from the mounting surface;

aligning the scale component on the mounting surface in this position by displacing the spacer;

removing the at least one spacer at the end of the aligning process; and moving the scale component in the direction of the mounting surface in order to make the holding force of the adhesive between the aligned scale component and the mounting surface effective.

2. The process of claim 1, wherein the scale component comprises a scale.

3. The process of claim 1, wherein the scale component comprises a scale carrier.

4. The process of claim 1, wherein the scale component comprises:

a scale carrier with a groove; and a scale inserted within the groove.

5. The process in accordance with claim 1, comprising applying a marking to the mounting surface parallel with the measuring direction; and aligning the scale component along the applied marking.

6. The process in accordance with claim 1, comprising:

fastening a positioning element, which has at least one positioning face, to the second body; and placing the scale component or the at least one spacer against the positioning face for alignment.

7. The process in accordance with claim 6, wherein the positioning element comprises a guide free of play, which aligns the scale component which is guided transversely in relation to the measuring direction.

8. The process in accordance with claim 7, comprising:

moving the positioning element in the measuring direction relative to the scale component; and displacing the at least one spacer in the measuring direction in relation to the scale component and in this way releases the scale component from the at least one spacer.

9. A device for the attachment of a scale component of a length measuring system to a mounting surface of a first body, wherein a second body is arranged to be displaceable in relation to the first body in a measuring direction, wherein an adhesive layer is provided between the scale component and the mounting surface, the device comprising:

at least one spacer that holds the scale component and supports the scale component at a distance from the mounting surface and is displaceably mounted on the mounting surface for alignment; and wherein the at least one spacer is actuated to remove the support and to make the holding force of the adhesive layer between the scale component and the mounting surface effective.

10. The device of claim 9, wherein the scale component comprises a scale.

11. The device of claim 9, wherein the scale component comprises a scale carrier.

12. The device of claim 9, wherein the scale component comprises:

a scale carrier with a groove; and a scale inserted within the groove.

13. The device of claim 9, wherein the adhesive layer comprises an adhesive foil that is applied to an underside of the scale component.

14. The device of claim 9, wherein the spacer comprises a rest, and the scale component is held on the rest at a distance from and parallel with the mounting surface.

15. The device of claim 13, wherein the spacer comprises a rest, and the scale component is held on the rest at a distance from and parallel with the mounting surface.

16. The device of claim 14, wherein the spacer extends around the scale component at the long sides and constitutes a parallel guidance free of play in the measuring direction.

17. The device of claim 15, wherein the spacer extends around the scale component at the long sides and constitutes a parallel guidance free of play in the measuring direction.

18. The device of claim 9, wherein the spacer is held on the mounting surface by a magnetic force.

* * * * *

UNITED STATES PATENT AND TRADEMARK OFFICE
CERTIFICATE OF CORRECTION

PATENT NO. : 6,349,481 B1
DATED : February 26, 2002
INVENTOR(S) : Günther Nelle

It is certified that error appears in the above-identified patent and that said Letters Patent is hereby corrected as shown below:

<u>Title page,</u>
Item [56], References Cited, U.S. PATENT DOCUMENTS, insert
-- 4,569,137    2/1986        Ichikawa --.
Insert -- 6,049,992    4/2000        Freitag et al. --.

FOREIGN PATENT DOCUMENTS, insert
-- JP    3-53109        3/1991 --.

OTHER PUBLICATIONS, insert -- Patent Abstracts of Japan regarding Japanese publication 03-053109, Vol. 015, no. 205, May 27, 1991. --.

Signed and Sealed this

Twenty-ninth Day of October, 2002

*Attest:*

*Attesting Officer*

JAMES E. ROGAN
*Director of the United States Patent and Trademark Office*